United States Patent
Wang et al.

(10) Patent No.: US 10,419,145 B2
(45) Date of Patent: Sep. 17, 2019

(54) IDENTIFYING VICTIMS AND AGGRESSORS IN FULL DUPLEX COMMUNICATION SYSTEMS

(71) Applicant: Intel Corporation, Santa Clara, CA (US)

(72) Inventors: Ping Wang, San Jose, CA (US); Feng Xue, Redwood City, CA (US); Yang-Seok Choi, Portland, OR (US); Shu-Ping Yeh, Campbell, CA (US); Shilpa Talwar, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/751,003

(22) PCT Filed: Sep. 18, 2015

(86) PCT No.: PCT/US2015/050909
§ 371 (c)(1),
(2) Date: Feb. 7, 2018

(87) PCT Pub. No.: WO2017/048273
PCT Pub. Date: Mar. 23, 2017

(65) Prior Publication Data
US 2018/0241493 A1   Aug. 23, 2018

(51) Int. Cl.
*H04W 72/12* (2009.01)
*H04J 11/00* (2006.01)
(Continued)

(52) U.S. Cl.
CPC ....... *H04J 11/0026* (2013.01); *H04J 11/0023* (2013.01); *H04W 24/04* (2013.01);
(Continued)

(58) Field of Classification Search
CPC ... H04W 24/10; H04W 72/082; H04W 24/08; H04W 72/0406; H04J 11/00
See application file for complete search history.

(56) References Cited

U.S. PATENT DOCUMENTS

| 2011/0310830 A1 | 12/2011 | Wu et al. |
| 2012/0028664 A1* | 2/2012 | Zhang ............... H04W 16/14 455/501 |

(Continued)

FOREIGN PATENT DOCUMENTS

| CN | 107852625 A | 3/2018 |
| WO | 2010/111428 A2 | 9/2010 |

(Continued)

OTHER PUBLICATIONS

Hong Kong Application No. 1811061.3, Notice of Publication of the Request to Record, Dec. 14, 2018, 2 pages.

(Continued)

*Primary Examiner* — Chi Ho A Lee
*Assistant Examiner* — Andrew Lee
(74) *Attorney, Agent, or Firm* — Jaffery Watson Mendonsa & Hamilton LLP

(57) ABSTRACT

Apparatus, systems, and methods to identify victims and aggressors of interference in full duplex communication systems are described. In one example, a controller comprises logic to detect a quality of service issue in a wireless communication downlink with a first user equipment in a first cell and in response to detecting the quality of service issue, determine whether the user equipment is a victim of interference from a second user equipment or is a victim of interference from a downlink with a second user equipment in a second cell. Other examples are also disclosed and claimed.

14 Claims, 11 Drawing Sheets

(51) Int. Cl.
  *H04W 24/08* (2009.01)
  *H04W 24/04* (2009.01)
  *H04W 24/10* (2009.01)
  *H04W 72/04* (2009.01)
  *H04W 72/08* (2009.01)
  *H04L 5/14* (2006.01)

(52) U.S. Cl.
  CPC ........... *H04W 24/08* (2013.01); *H04W 24/10* (2013.01); *H04W 72/0406* (2013.01); *H04W 72/082* (2013.01); *H04L 5/14* (2013.01); *H04W 72/1231* (2013.01)

(56) References Cited

U.S. PATENT DOCUMENTS

| | | | | |
|---|---|---|---|---|
| 2012/0207038 | A1* | 8/2012 | Choi | H04W 16/14 370/252 |
| 2013/0033998 | A1* | 2/2013 | Seo | H04W 24/00 370/252 |
| 2013/0044697 | A1 | 2/2013 | Yoo et al. | |
| 2013/0343241 | A1* | 12/2013 | Niu | H04B 15/00 370/280 |
| 2014/0140295 | A1* | 5/2014 | Manssour | H04L 5/0032 370/329 |
| 2014/0198680 | A1* | 7/2014 | Siomina | H04L 5/14 370/252 |
| 2014/0241293 | A1* | 8/2014 | Luo | H04L 5/0053 370/329 |
| 2014/0286291 | A1* | 9/2014 | Einhaus | H04B 7/024 370/329 |
| 2016/0302125 | A1* | 10/2016 | Tejedor | H04W 16/14 |
| 2017/0026915 | A1* | 1/2017 | Madan | H04W 52/244 |
| 2017/0339660 | A1* | 11/2017 | Kazmi | H04B 17/309 |
| 2018/0176810 | A1* | 6/2018 | Thangarasa | H04W 76/11 |

FOREIGN PATENT DOCUMENTS

| | | |
|---|---|---|
| WO | 2012/135795 A1 | 10/2012 |
| WO | 2013/177780 A1 | 12/2013 |
| WO | 2017/048273 A1 | 3/2017 |

OTHER PUBLICATIONS

International Preliminary Report on Patentability for Application No. PCT/US12015/050909, dated Mar. 20, 2018, 7 pages.

* cited by examiner

IDENTIFYING VICTIMS AND AGGRESSORS IN FULL DUPLEX COMMUNICATION SYSTEMS

RELATED APPLICATIONS

This application claims priority under 35 U.S.C. § 371 to International Application No. PCT/US2015/050909 filed Sep. 18, 2015, entitled IDENTIFYING VICTIMS AND AGGRESSORS IN FULL DUPLEX COMMUNICATION SYSTEMS. The entire disclosure(s) of these documents are incorporated by reference herein for all purposes.

FIELD

The present disclosure generally relates to the field of electronic communication. More particularly, aspects generally relate to identifying victims and aggressors in full duplex communication systems.

BACKGROUND

Conventional wireless systems are half duplex in which uplink (UL) and downlink (DL) transmissions are performed in orthogonal time resources (Time-Division Duplex (TDD)) or in orthogonal frequency resources (Frequency-Division Duplex (FDD)).

One approach to increase the spectral efficiency (SE) of a wireless system is to use full-duplex transmitters and receivers that transmit and receive at same time and frequency. A full duplex system operating under ideal conditions doubles the spectral efficiency of a conventional half duplex system for both downlink and uplink signals. In practice, however, additional interference signals are introduced in a full duplex communication system due to simultaneous transmission and reception (STR), which may cause interference between adjacent base stations and between proximate wireless devices (WD), also referred to as user equipment (UE). Accordingly, techniques to identify victims and aggressors of interference in full duplex communication systems may find utility, e.g., in electronic communication systems for electronic devices.

BRIEF DESCRIPTION OF THE DRAWINGS

The detailed description is provided with reference to the accompanying figures. The use of the same reference numbers in different figures indicates similar or identical items.

Figure 1:
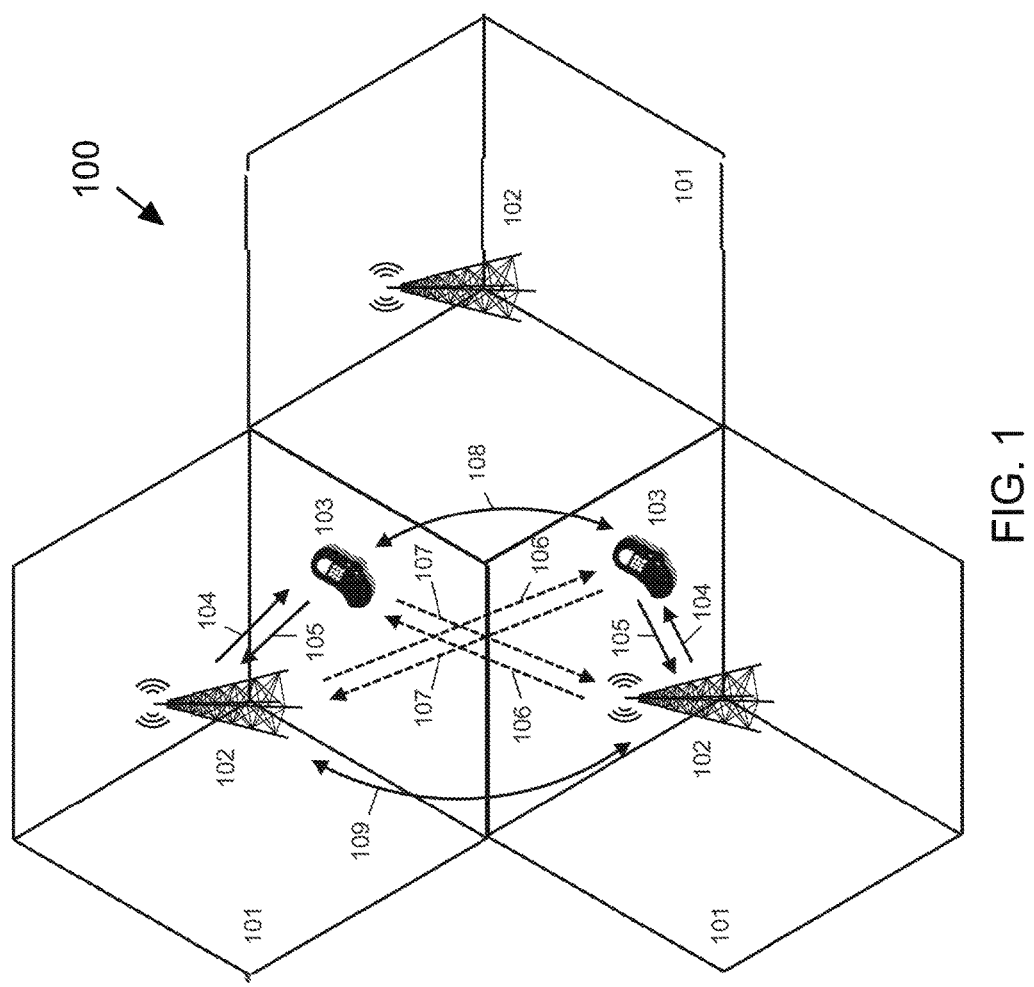
FIG. 1 is a schematic, block diagram illustration of an exemplary full-duplex communication system in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

As described in brief above, full duplex communication systems which support simultaneous transmit and receive in the same frequency at the same time can potentially double the spectrum efficiency. However, full duplex communication systems introduce interference between its transmission and receiver chain. Further, full duplex systems in cellular networks are characterized by complicated interference environments, including base station to base station interference in uplink receiver(s) and interference between user equipment, which may be referred to herein as UE-to-UE interference in downlink receiver(s).

For cellular communication systems such as LTE, user equipment transmitting uplink signals create conventional co-channel interference to other uplink signals in other cells. Yet for full-duplex cellular systems, uplink signals may create interference with downlink signals, especially downlink signal nearby, that is, interference between user equipment. Such interference may corrupt a victim downlink signal.

In some examples interference between user equipment is exacerbated when both two or more pieces of user equipment are close to each other and at the edge of a cell. In this location a received downlink signal is typically quite weak. By contrast, user equipment near the edge of a cell transmits at the level close to the maximum output power, thus generating interference between user equipment. Thus, service quality parameters are particularly vulnerable to severe performance degradation caused by interference between user equipment in high-density indoor environments, e.g., cafeterias, airports, stadiums, etc. Further, stationary user equipment in such environments are likely to transmit/receive persistently for long periods of time, resulting in prolonged service disruption due to strong interference. Such service disruption caused by interference between user equipment needs to be properly handled to obtain the benefits of full-duplex capability.

In order to implement measures to correct, or at least to compensate for, interference in full duplex communication systems one must first identify communication links that are victims of interference and the source of the interference, i.e., whether the interference is generated by a base station or by another piece of user equipment. Further, one must identify the aggressor if the interference is generated by user equipment, i.e., the source of the interference.

Subject matter described herein provides techniques to identify a victim downlink user equipment and to identify an uplink aggressor for interference between user-equipment in a full duplex communication system. In one aspect, it may be determined whether a downlink UE is dominantly impacted by UE-to-UE interference or by inter-cell interferences from other base stations. In order to provide robust control channel regions, most full duplex cellular communication systems do not utilize full-duplex techniques in control channel regions. Uplink data transmission does not overlap with downlink control channel regions. Thus, downlink control channel regions only experience inter-cell downlink interference, while downlink data channel regions experiences both inter-cell downlink interference and UE-to-UE interference. In one aspect differences between control channel regions and data channel regions may be exploited to determine whether the downlink reception at a piece of user equipment is under overwhelming UE-to-UE interference. In another aspect, the uplink aggressor may be identified from the possible intra-cell and inter-cell uplink aggressor candidate pool.

Additional features and characteristics these techniques and communication systems in which the techniques may be incorporated are described below with reference to FIGS. 1-12.

FIG. 1 is a schematic, block diagram illustration of an exemplary full-duplex communication system system 100, and the signals that are useful and the signals that cause interference that are associated with system 100. System 100 comprises a plurality of cells 101, of which only three cells are shown and that are represented by hexagonal shapes. Each cell 101 can have one or more sectors, which are represented as rhombuses within a hexagonal shape. It should be understood that a cell 101 and/or a sector respectively can and do in reality have a shape different from a hexagon or a rhombus. Each cell 101 comprises at least one base station (BS) 102. A plurality of wireless devices (WDs) 103 may be located throughout system 100, although only two WDs are shown.

A base station 102 can be embodied as, but is not limited to, an evolved NodeB (eNB or eNodeB), a macro-cell base station, a pico-cell base station, a femto-cell base station, or the like. A wireless device 103 can embodied as, but is not limited to, a mobile station (MS), a subscriber station (SS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, an information-handling system, or the like as described herein.

Useful downlink (DL) signals from a BS 102 to a WD 103 are indicated at 104. Useful uplink (UL) signals from a WD 103 to a BS 102 are indicated at 105. For a half-duplex system, a downlink signal 104 generated by a BS 102 for a WD 103 connected to the BS causes an interference signal 106 to be received at a WD 103 that is not connected to the BS. Similarly, an uplink signal 105 generated by a WD 103 causes an interference signal 107 to be received at a BS 102 to which the WD is not connected. Interference signals 106 and 107 are represented by dashed lines in FIG. 1.

In addition to interference signals 106 and 107 that occur in a half-duplex system, a full-duplex system would include two new interference signals that would be caused by Simultaneous Transmit and Receive (STR). In particular, a WD-WD interference signal 108 would be observed when one WD is transmitting in an uplink signal to its home BS while the other WD would be receiving a downlink signal from its home BS. The second new interference signal that would be caused by STR would be a BS-BS interference signal 109, and would be observed when one BS is transmitting in a downlink signal to a WD while another BS is receiving an uplink signal from a WD.

Figure 2:
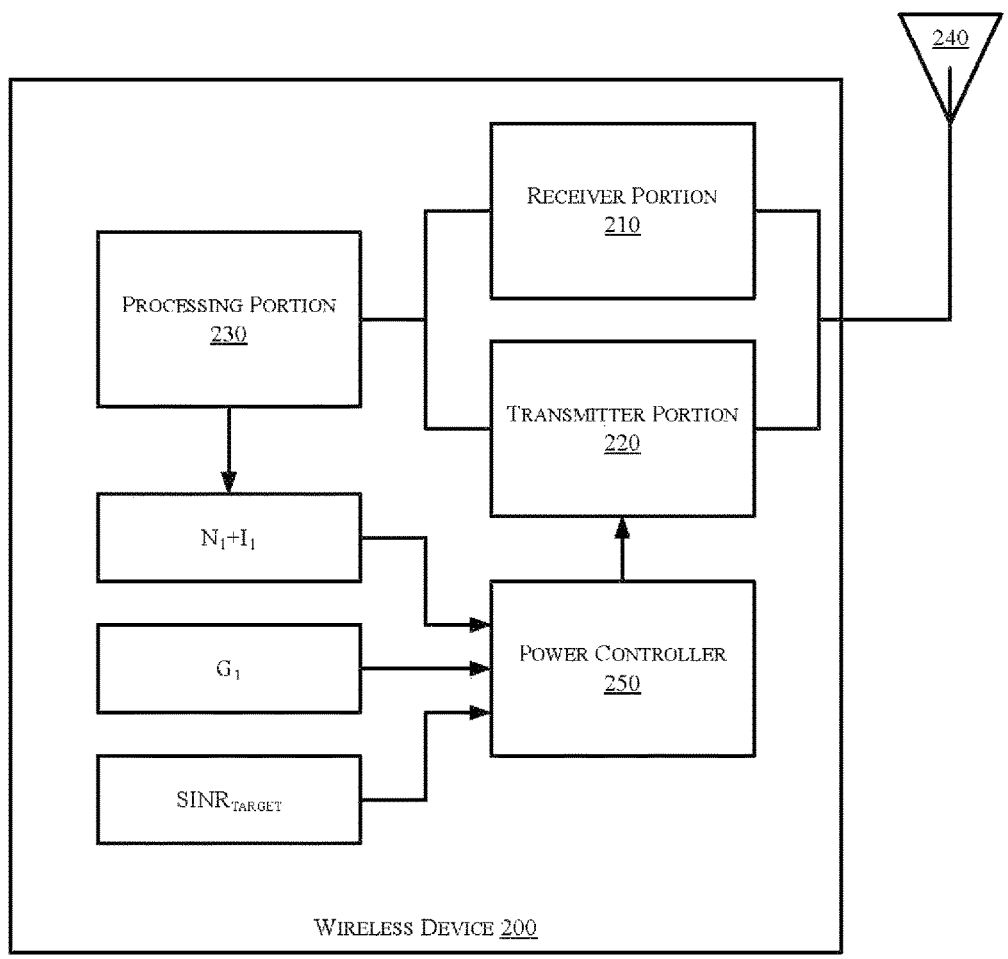
FIG. 2 is a schematic, block diagram illustration of functional components of a wireless device in accordance with various examples discussed herein.

FIG. 2 is a schematic, block diagram illustration of a wireless device (WD) 200 according to the subject matter disclosed herein. Wireless device 200 comprises a receiver portion 210, a transmitter portion 220, a processing portion 230, an antenna 240, and a power controller 250. Receiver portion 210 and transmitter portion 220 are coupled in a well-known manner to processing portion 230 and to one or more antennas 240. In some examples, uplink noise-plus-interference level $(N_1+I_1)$ is received from a base station such as base station 102 by antenna 240 and receiver portion 210 by either an open-loop or a closed-loop feedback technique. Processing portion 230 extracts the $N_1+I_1$ at the home base station that is received from the home base station. The $N_1+I_1$ information is passed to power controller 250 along with gain $G_1$ information and $SINR_{Target}$ information. Gain $G_1$ information can be calculated (approximately) based on half-duplex DL signal-to-interference ratio and full-duplex DL signal to UE-UE interference ratio. Power controller 250, which is coupled to transmitter portion 220, controls the UL transmit power output from transmitter portion 220.

Figure 3:
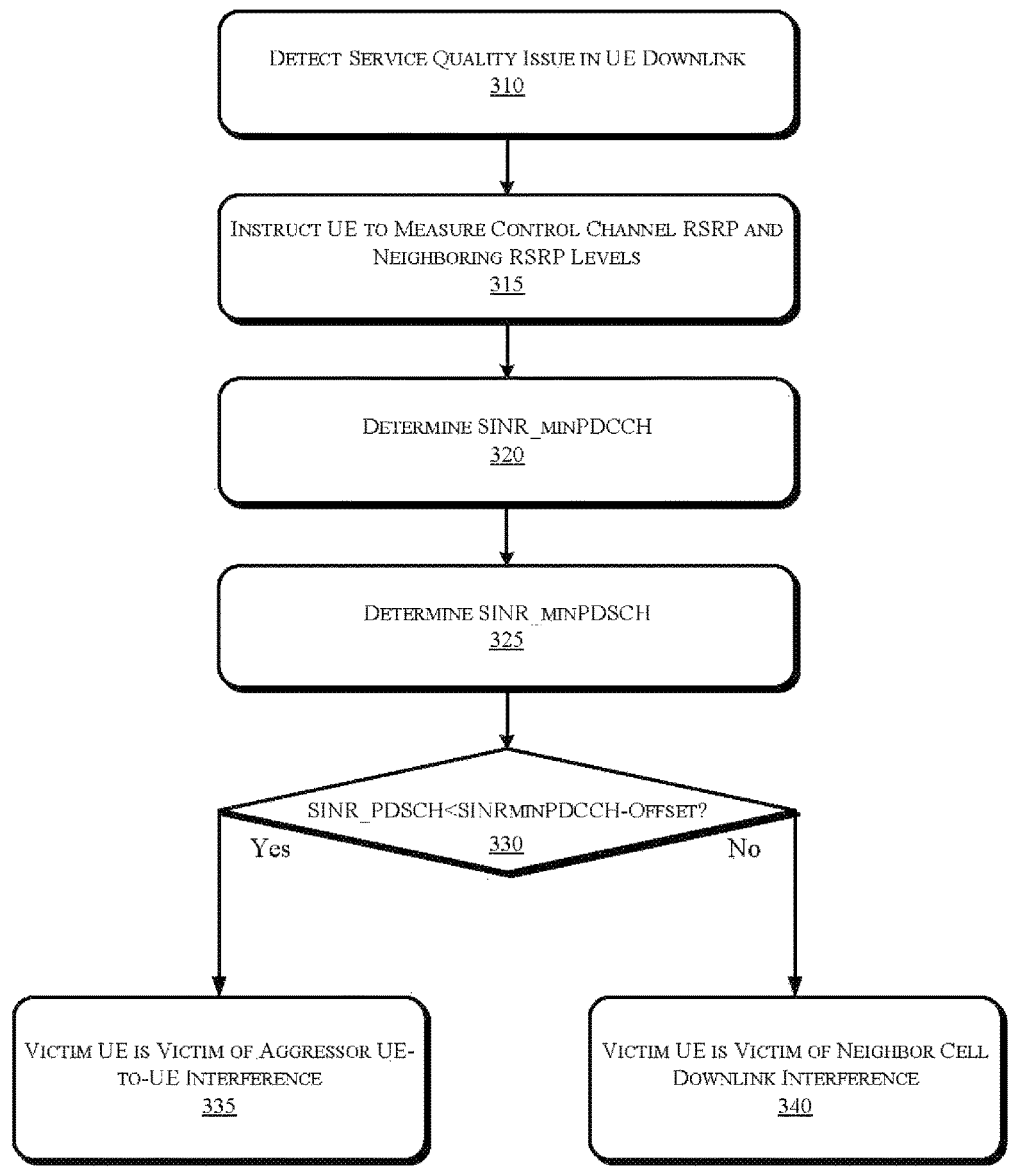
FIG. 3 is a flowchart illustrating high-level operations in a method to identify a downlink victim of interference in accordance with various examples discussed herein.

FIG. 3 is a flowchart illustrating high-level operations in a method to identify a downlink victim of interference in accordance with various examples discussed herein. In some examples the operations depicted in FIG. 3 may be implemented by a processing device embedded in a network node, e.g., a processor in a base station such as one of the base stations 102 depicted in FIG. 1. In an LTE network the base station may be embodied as an eNB which allows simultaneous transmission on downlink and receiving on uplink.

In an LTE network without dominant UE-to-UE interference, a UE proximate an edge of the cell can achieve a guaranteed minimum throughput most of the time. If an LTE BS spots a service disruption in a piece of user equipment (UE) it services then the eNB may take action to determine possible causes of service disruption. In particular, for an eNB knowing that there are possible UE-to-UE interference, the eNB can implement a detection procedure to determine whether the UE is under overwhelming UE-to-UE interference and from which UE.

In some examples a full-duplex cellular system may utilize a frame structure in which the downlink control signal region is always orthogonal to both uplink data region and downlink data region in the same cell, and in which the downlink data region can be overlapping with uplink data region. This ensures a robust transmission of the downlink control signal from the eNB to the UE. Thus, the downlink control channel does not experience interference from uplink UE, but does experience interference from other eNbs, similar to a half-duplex communication system.

Referring to FIG. 3, at operation 310 a service quality disruption in a UE downlink may be detected by an eNB servicing the UE. For example, the service quality disruption may be detected by receiving multiple consecutive NACKs or by receiving a low reported CQI.

At operation 315 the eNB servicing the UE may instruct the UE to measure its control channel control channel reference signal power (RSRP) over resource elements for control channel symbols and neighboring cell RSRP levels at control symbols. The pathloss from the servicing eNB and from adjacent eNBs can be derived from the UE's measurement of RSRP and the known transmission power of the downlink reference signals (RS), which is broadcast by the eNB. Once the pathloss is known, the received power spectrum density (psd) of the eNB and neighbor eNBs are known too.

At operation 320 the eNB determines a parameter SINR_minPDCCH corresponding to a minimum signal to noise ratio (SINR) of the control channel. In one example the parameter is determined using the equation:

$$\text{SINR\_minPDCCH} = 10\log 10 \frac{P0}{\sum_{i=1}^{N-1} Pi} \qquad \text{EQ1}$$

where N is the total number of the eNBs considered including the serving cell (cell 0). P0, P1, ... PN-1 are the psd of the serving cell and adjacent interfering cells (cell 1, 2, ..., N-1) respectively among N cells, measured at serving cell PDCCH RS region (average power obtained within the RE and normalized to the subcarrier spacing). The sum $\Sigma_{i=1}^{N-1} Pi$ models the interference from all cells. SINR_minPDCCH represents the minimum SINR for data channel transmission when there is only interference from adjacent downlink transmission, since the denominator is achieved by assuming all the interfering BSs are at full load. Therefore, SINR_minPDCCH can be used as threshold to decide if the downlink UE is under additional UE-to-UE interference.

At operation 325 the eNB determines a parameter SINR_minPDSCH corresponding to the minimum signal to noise ratio (SINR) of the physical downlink shared channel. Assuming $P_{0\_pdsch}, P_{1\_pdsch}, \ldots P_{N-1\_pdsch}$ are the received power spectrum density (psd) of the serving cell and adjacent interfering cells respectively among N cells measured at serving cell PDSCH RS region (average power obtained within the RE and normalized to the subcarrier spacing), then SINR_PDSCH may be determined using the equation:

$$\text{SINR\_minPDSCH} = 10\log 10 \frac{P0\_pdsch}{\sum_{i=1}^{N-1} Pipdsch} \qquad \text{EQ2}$$

At operation 330 it is determined whether the minimum signal to noise ratio (SINR) of the physical downlink shared channel (SINR_minPDSCH) is less than the minimum signal to noise ratio (SINR) of the control channel (SINR_minPDCCH) minus an offset, which is a tunable factor. If, at operation 330, the minimum signal to noise ratio (SINR) of the physical downlink shared channel (SINR_minPDSCH) is less than the minimum signal to noise ratio (SINR) of the control channel (SINR_minPDCCH) minus an offset then control passes to operation 335 and the eNB determines that the victim UE is a victim of UE-to-UE interference from an aggressor UE.

By contrast, if at operation 330 the minimum signal to noise ratio (SINR) of the physical downlink shared channel (SINR_minPDSCH) is not less than the minimum signal to noise ratio (SINR) of the control channel (SINR_minPDCCH) minus an offset then control passes to operation 335 and the eNB determines that the victim UE is a victim of downlink interference from a neighboring cell.

Thus, the operations in FIG. 3 enable a base station such as an eNB to categorize an interference victim as a victim of either UE-to-UE interference from one or more proximate UE devices, or as a victim of downlink interference from one or more base stations in one or more neighboring cells. In the event that the base station determines that an interference victim is a victim of downlink interference then the base station may implement a procedure to identify the uplink aggressor(s) which are generating the UE-to-UE interference. One method to do so will be explained with reference to FIG. 4 and FIG. 5.

Figure 5:
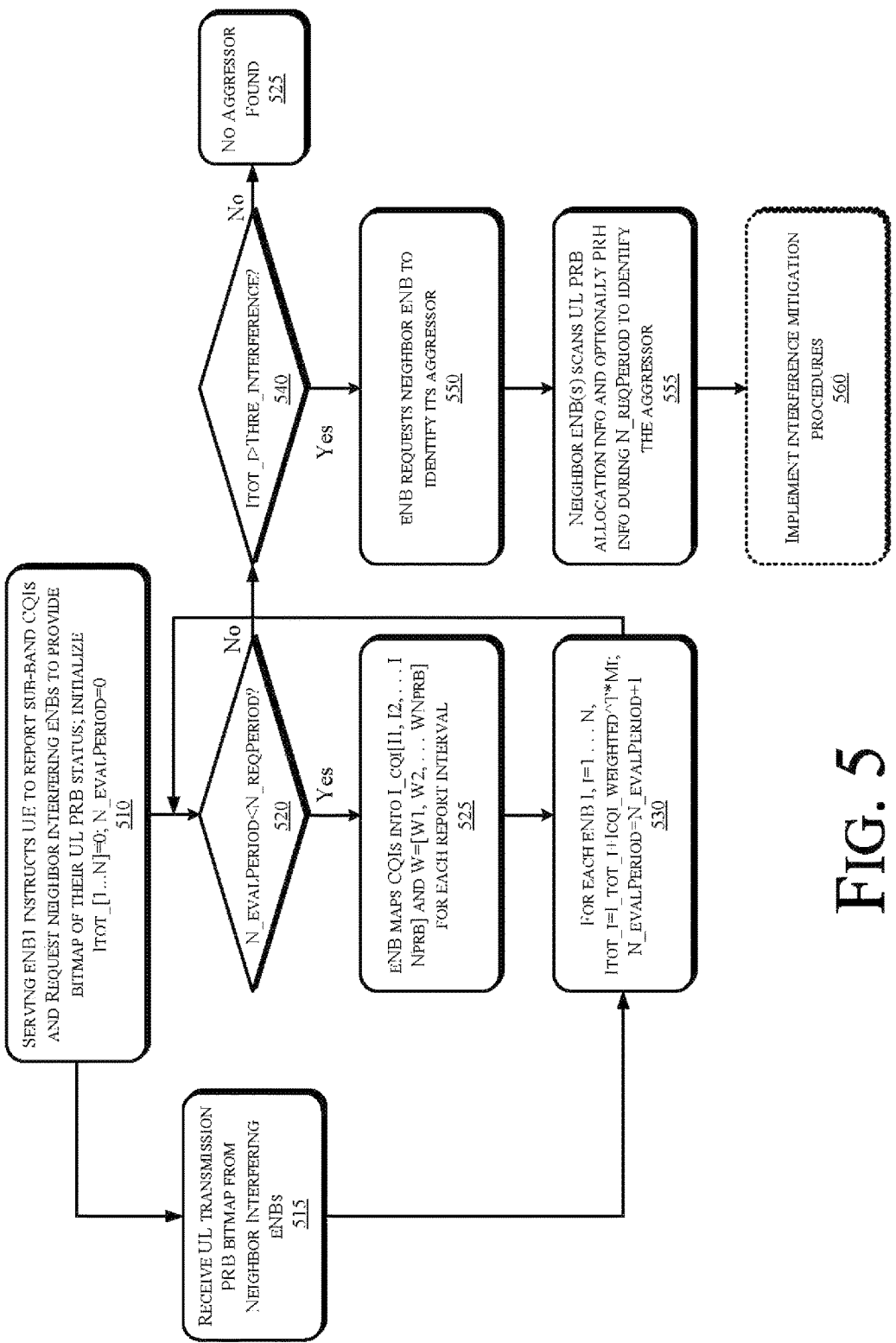
FIG. 5 is a flowchart illustrating high-level operations in a method to identify a downlink victim of interference in accordance with various examples discussed herein.

Referring to FIG. 5, at operation 510 the eNB which has detected UE-to-UE interference instructs the UE to report sub-band channel quality indicators (CQIs) and to request neighbor interfering eNBs to provide a bitmap of their respective uplink physical resource block (PRB) status. At operation 515 the serving eNB receives the PRB bitmap, Mi, from neighbor interfering eNBs, where Mi=[m1, m2, ... mNprb] is the UL PRB patterns eNB collected from interfering cells i=2, ..., M as well as its own cell i=1, where element of Mi has value of 1 to represent that the corresponding UL PRB is used by UL transmission or 0 to represent that the corresponding UL PRB is not used by UL transmission.

Once the eNB receives the sub-band CQIs it begins a process of mapping the CQIs into an interference bitmap vector I_CQI=[$I_1, I_2, \ldots, I_{NPRB}$] with an element value of 0 to represent no interference and 1 if there is interference. Thus, at operation 510 the serving eNB initializes a vector $I_{TOT}$[1 ... N] to zero and sets N_EVALPERIOD=0.

The process then enters a loop defined by operations 520-530 in which, at operation 520 it is determined whether the number of periods evaluated N_EVALPERIOD is less than a threshold which defines a minimum number of periods required (N_REQPERIOD) to generate a full data set. In some examples the threshold N_REQPERIOD may be a fixed number of periods, while in other examples the threshold may be set dynamically as a function of one or more operational thresholds of the network. In some examples, the threshold may be set differently as a function of scheduler implementation (e.g., semi-persistent, persistent or dynamic) or deployment scenarios (indoor semi-static or outdoor high mobility etc.).

Figure 4:
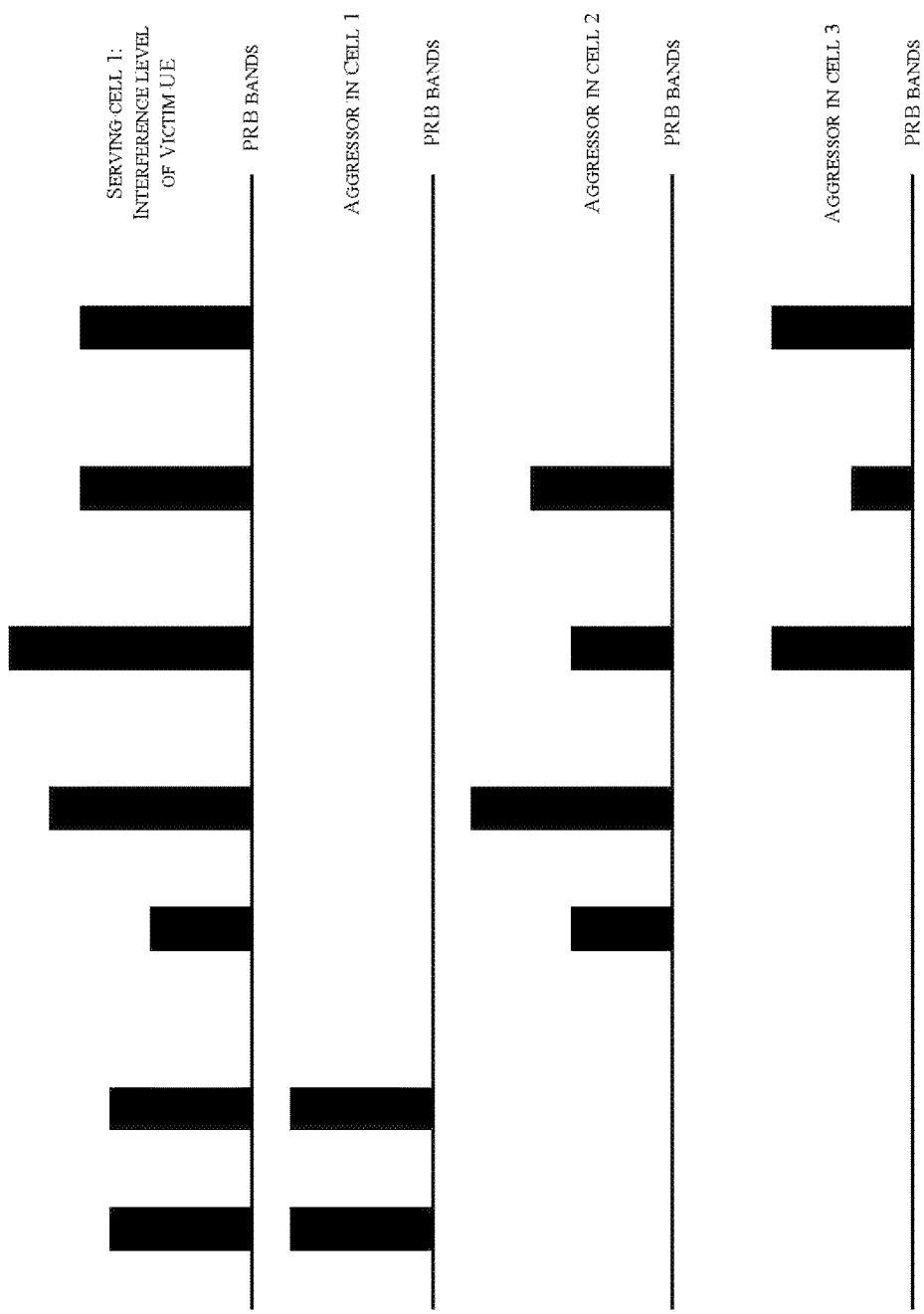
FIG. 4 is a schematic illustration of interference contributions from uplink aggressors in accordance with various examples discussed herein.

If, at operation 520 N_EVALPERIOD is less than N_REQPERIOD then control passes to operation 525 and the serving eNB maps the CQIs into I_CQI=[$I_1, I_2, \ldots I_{NPRB}$] and sets a weighting factor vector W=[$W_1, W_2 \ldots W_{NPRB}$] for each report interval. FIG. 4 is an illustration of the interference contributions. The top timeline of the victim UE illustrates the location of PRBs (or subbands) of interfered ones based on CQI reports, so all these locations have element 1 in the corresponding I_cqi vector. The other timelines indicate the location of PRBs interference with the victim UE from the uplink aggressors in cells 1, 2, and 3. Note that different aggressors from different cells may overlap in PRB location (e.g., aggressor in cell 2 and 3 in FIG. 2), yet different aggressors in the same cell can only have different PRB locations due to the orthogonality of intra-cell uplink UE locations.

At operation 530, for each eNB I=[1 ... N] the eNB determines a total interference contribution using equation (3)

$$I_{tot_1} = I_{tot_1} + [[I]_{eqi_{weighted}}]^T * M1 \quad \text{EQ3}$$

for i=1, ..., M, where $I_{eqi_{weighted}}$ represents a weighted version of I_cqi, that is, the ith element is $I_{eqi\,[i]}*Wi$, where W=[W1, W2, ..., WNPRB] is an adjustable weighing factor vector. W can be used to represent the different level of the interference at different PRBs derived from the CQI feedback values (reflected in FIG. 4 as the various heights of the bars at different PRB bands). The eNB increments the evaluation period (N_evalPeriod=N_evalPeriod+1) and control then passes back to operation 520. Thus, the operations in the loop defined by operations 520-530 generate a weighted interference value for all interference measurements acting on the victim.

If, at operation 520, the required number of evaluation periods has been satisfied then control passes to operation 540, where it is determined whether the weighted interference value, $I_{tot\_i}$, exceeds a threshold interference value Thre_interference. In some examples the threshold value Thre_interference may be static. In further examples the threshold value Thre_interference may be set dynamically in response to operating conditions of the communication network. For instance, this threshold could be set based on knowledge of the statistics of the total interference in the network (e.g., set as 50% percentile).

If, at operation 540, the weighted interference value is not greater than the threshold then control passes to operation 525 and the process terminates without finding an aggressor. By contrast, if at operation 540 the weighted interference value is greater than the threshold then control passes to operation 530 and the serving eNB requests one or more of the neighboring eNBs to identify its aggressor. Because each aggressor UE candidate has a distinct UL PRB allocation pattern in one cell and the aggressor UE is likely having little Power Headroom (PHR), the eNb that is servicing aggressor belongs to can identify the specific aggressor(s). If the aggressor(s) belong to the serving eNB (i=1), eNB can easily identify as it has all information of UL PRB and PHR info of its own cell. By contrast, if the aggressor(s) belong to the neighboring eNBs (i !=1), serving eNB may notify the neighbors (e.g., by X2 interface) the interference pattern during the evaluation interval, and then the neighboring eNB can identify the aggressor(s).

At operation 555, in response to the request the neighbor eNB(s) that receive the request scan their respective uplink PRB allocation (and optionally their PHR information) to identify one or more aggressors that may be generating interference with the victim.

Optionally, at operation 560, once one or more aggressors are identified, one or more interference mitigation procedures can be implemented. For example, a scheduler can use the aggressor information to schedule DL and UL PRB for victim and aggressor UE orthogonally in order to avoid interference. Alternatively, or in addition, the scheduler can lower UL transmission power of the aggressor UEs. Other measures may be implemented.

Figure 6:
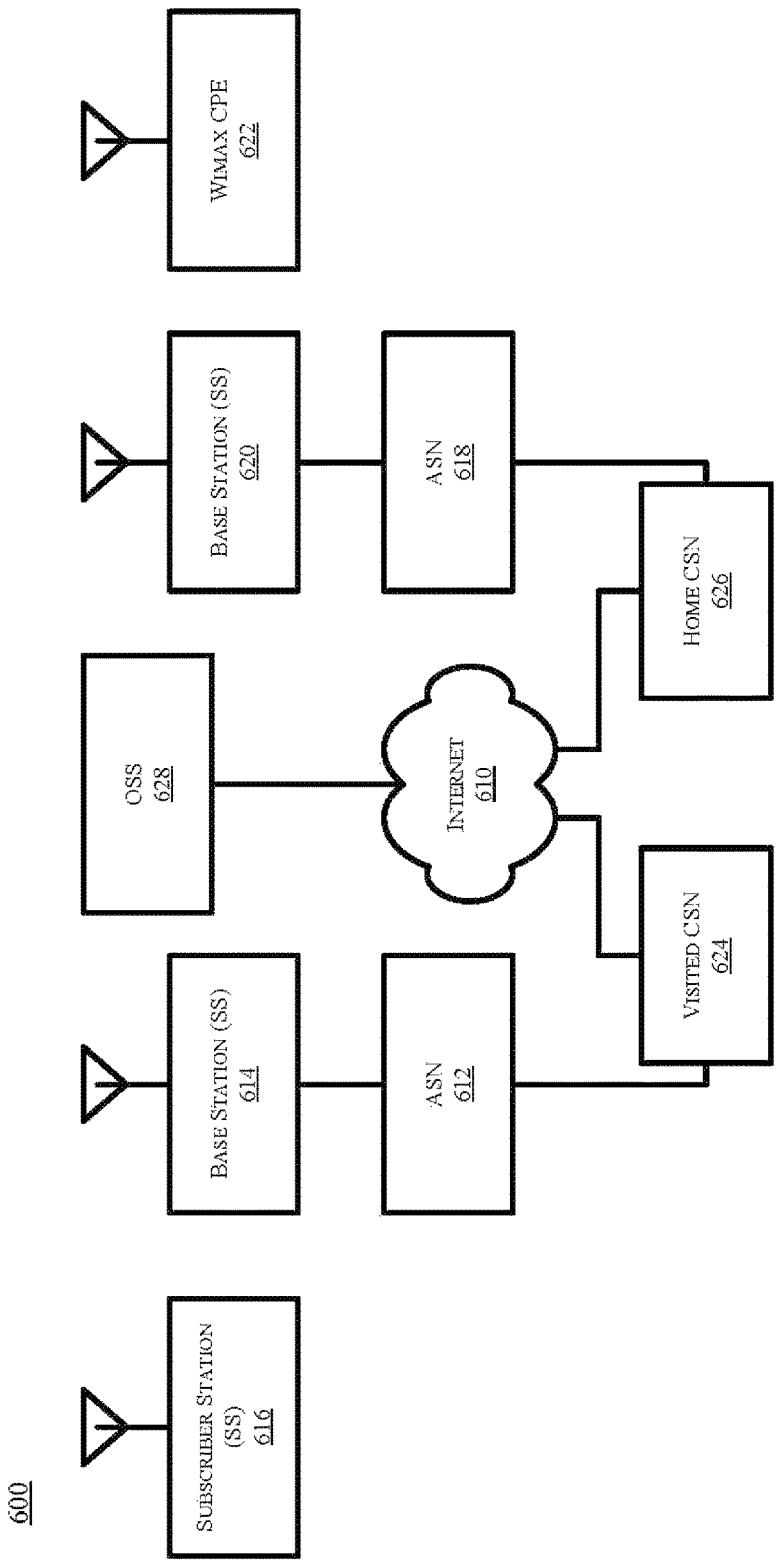
FIG. 6 is a schematic, block diagram illustration of a wireless network in accordance with one or more exemplary embodiments disclosed herein.

FIG. 6 is a schematic, block diagram illustration of a wireless network 600 in accordance with one or more exemplary embodiments disclosed herein. One or more of the elements of wireless network 600 may be capable of implementing methods to identify victims and aggressors according to the subject matter disclosed herein. As shown in FIG. 6, network 600 may be an Internet-Protocol-type (IP-type) network comprising an Internet-type network 610, or the like, that is capable of supporting mobile wireless access and/or fixed wireless access to Internet 610.

In one or more examples, network 600 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 600 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 600 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 612 is capable of coupling with base station (BS) 614 to provide wireless communication between subscriber station (SS) 616 (also referred to herein as a wireless terminal) and Internet 610. In one example, subscriber station 616 may comprise a mobile-type device or information-handling system capable of wirelessly communicating via network 600, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 612 may implement profiles that are capable of defining the mapping of network functions to one or more physical entities on network 600. Base station 614 may comprise radio equipment to provide radio-frequency (RF) communication with subscriber station 616, and may comprise, for example, the physical layer (PHY) and media access control (MAC) layer equipment in compliance with an IEEE 802.16e-type standard. Base station 614 may further comprise an IP backplane to couple to Internet 610 via ASN 612, although the scope of the claimed subject matter is not limited in these respects.

Network 600 may further comprise a visited connectivity service network (CSN) 624 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 626, and the scope of the claimed subject matter is not limited in these respects.

Visited CSN 624 may be referred to as a visited CSN in the case, for example, in which visited CSN 624 is not part of the regular service provider of subscriber station 616, for example, in which subscriber station 616 is roaming away from its home CSN, such as home CSN 626, or, for example, in which network 600 is part of the regular service provider of subscriber station, but in which network 600 may be in another location or state that is not the main or home location of subscriber station 616.

In a fixed wireless arrangement, WiMAX-type customer premises equipment (CPE) 622 may be located in a home or business to provide home or business customer broadband access to Internet 610 via base station 620, ASN 618, and home CSN 626 in a manner similar to access by subscriber station 616 via base station 614, ASN 612, and visited CSN 624, a difference being that WiMAX CPE 622 is generally disposed in a stationary location, although it may be moved to different locations as needed, whereas subscriber station may be utilized at one or more locations if subscriber station 616 is within range of base station 614 for example.

It should be noted that CPE 622 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 622 is capable of providing an uplink-transmit-power control technique that reduces interference experienced at other wireless devices according to the subject matter disclosed herein.

In accordance with one or more examples, operation support system (OSS) 628 may be part of network 600 to provide management functions for network 600 and to provide interfaces between functional entities of network 600. Network 600 of FIG. 6 is merely one type of wireless network showing a certain number of the components of network 600; however, the scope of the claimed subject matter is not limited in these respects.

Figure 7:
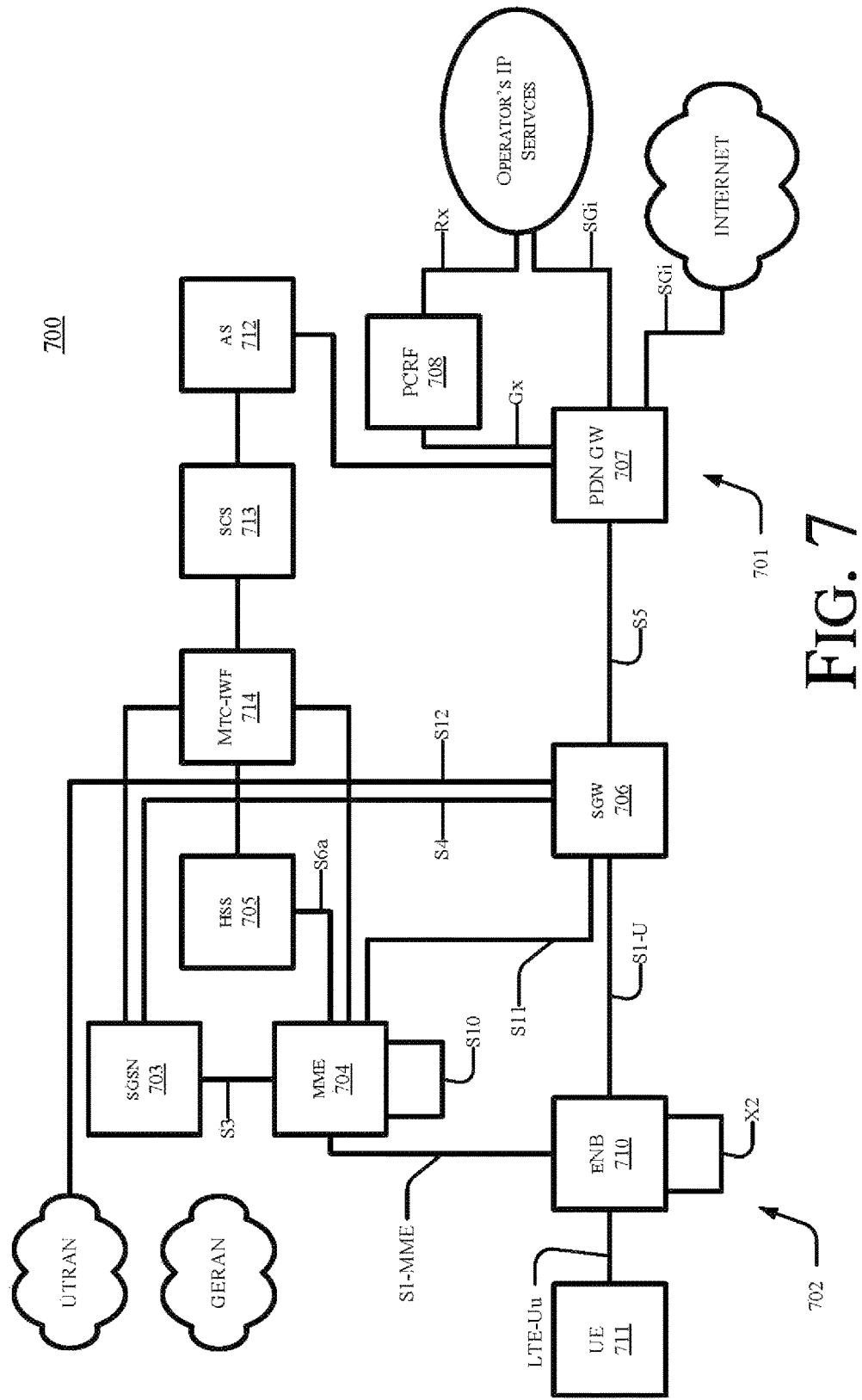
FIG. 7 is a schematic, block diagram illustration of a 3GPP LTE network in accordance with one or more exemplary embodiments disclosed herein.

FIG. 7 shows an exemplary block diagram of the overall architecture of a 3GPP LTE network 700 that includes one or more devices that are capable of implementing methods to identify victims and aggressors according to the subject matter disclosed herein. FIG. 7 also generally shows exemplary network elements and exemplary standardized interfaces. At a high level, network 700 comprises a core network (CN) 701 (also referred to as an evolved Packet System (EPC)), and an air-interface access network E UTRAN 702. CN 701 is responsible for the overall control of the various User Equipment (UE) connected to the network and establishment of the bearers. CN 701 may include functional entities, such as a home agent and/or an ANDSF server or entity, although not explicitly depicted. E UTRAN 702 is responsible for all radio-related functions.

The main exemplary logical nodes of CN 701 include, but are not limited to, a Serving GPRS Support Node 703, the Mobility Management Entity 704, a Home Subscriber Server (HSS) 705, a Serving Gate (SGW) 706, a PDN Gateway 707 and a Policy and Charging Rules Function (PCRF) Manager 708. The functionality of each of the network elements of CN 701 is well known and is not described herein. Each of the network elements of CN 701 are interconnected by well-known exemplary standardized interfaces, some of which are indicated in FIG. 7, such as interfaces S3, S4, S5, etc., although not described herein.

While CN 701 includes many logical nodes, the E UTRAN access network 702 is formed by at least one node, such as evolved NodeB (base station (BS), eNB or eNodeB) 710, which connects to one or more User Equipment (UE) 711, of which only one is depicted in FIG. 7. UE 711 is also referred to herein as a wireless device (WD) and/or a subscriber station (SS), and can include an M2M-type device. In one EXAMPLE, UE 711 is capable of providing an uplink-transmit-power control technique that reduces interference experienced at other wireless devices according to the subject matter disclosed herein. In one exemplary configuration, a single cell of an E UTRAN access network 702 provides one substantially localized geographical transmission point (having multiple antenna devices) that provides access to one or more UEs. In another exemplary configuration, a single cell of an E UTRAN access network 702 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 704 by an S1 MME interface and to SGW 706 by an S1 U interface. The protocols that run between the eNBs and the UEs are generally referred to as the "AS protocols." Details of the various interfaces are well known and not described herein.

The eNB 710 hosts the PHYsical (PHY), Medium Access Control (MAC), Radio Link Control (RLC), and Packet Data Control Protocol (PDCP) layers, which are not shown in FIG. 7, and which include the functionality of user-plane header-compression and encryption. The eNB 710 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 710 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 711, generates pages for UEs 711 over the air, broadcasts system information, controls UE measurement reporting, such as the periodicity of Channel Quality Information (CQI) reports, and allocates cell-level temporary identifiers to active UEs 711. The RRC layer also executes transfer of UE context from a source eNB to a target eNB during handover, and provides integrity protection for RRC messages. Additionally, the RRC layer is responsible for the setting up and maintenance of radio bearers.

Figure 8:
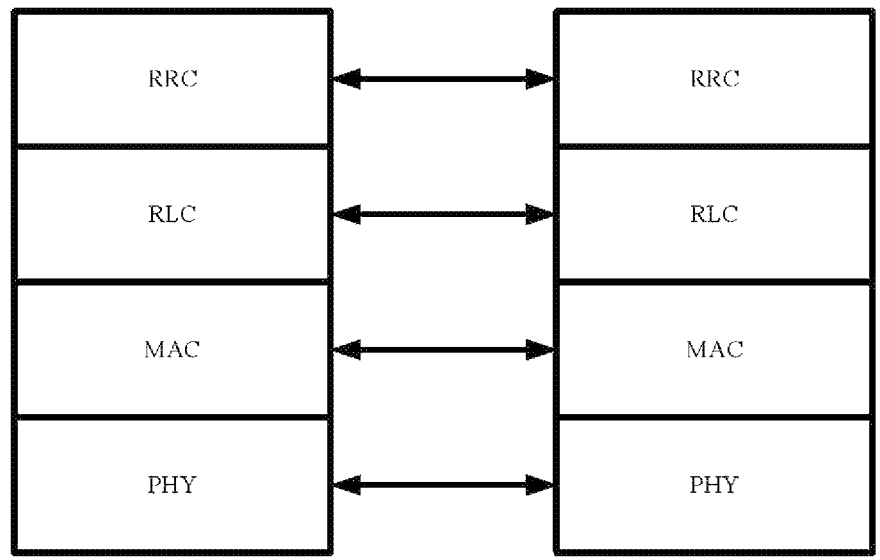
FIGS. 8 and 9 are schematic, block diagram illustrations, respectively, of radio interface protocol structures between a UE and an eNodeB based on a 3GPP-type radio access network standard in accordance with one or more exemplary embodiments disclosed herein.
Figure 9:
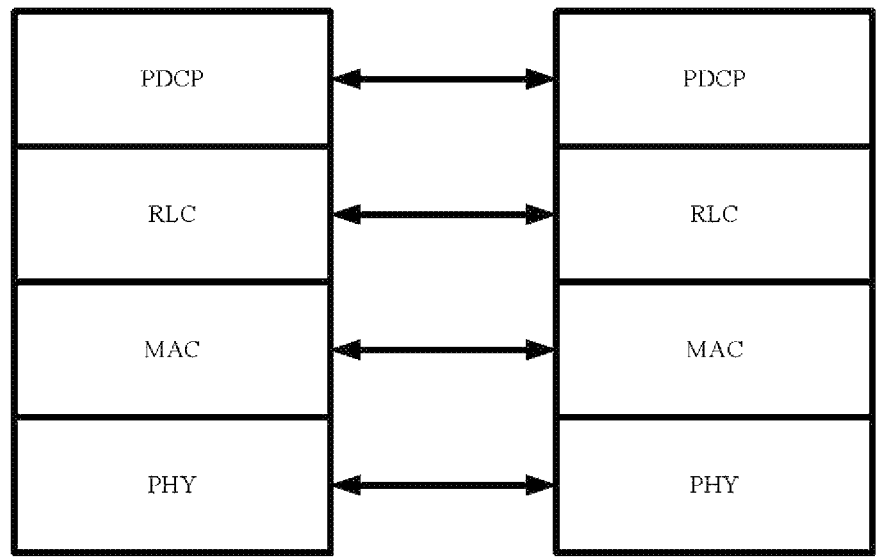

FIGS. 8 and 9 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 8 depicts individual layers of a radio protocol control plane and FIG. 9 depicts individual layers of a radio protocol user plane. The protocol layers of FIGS. 8 and 9 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 10:
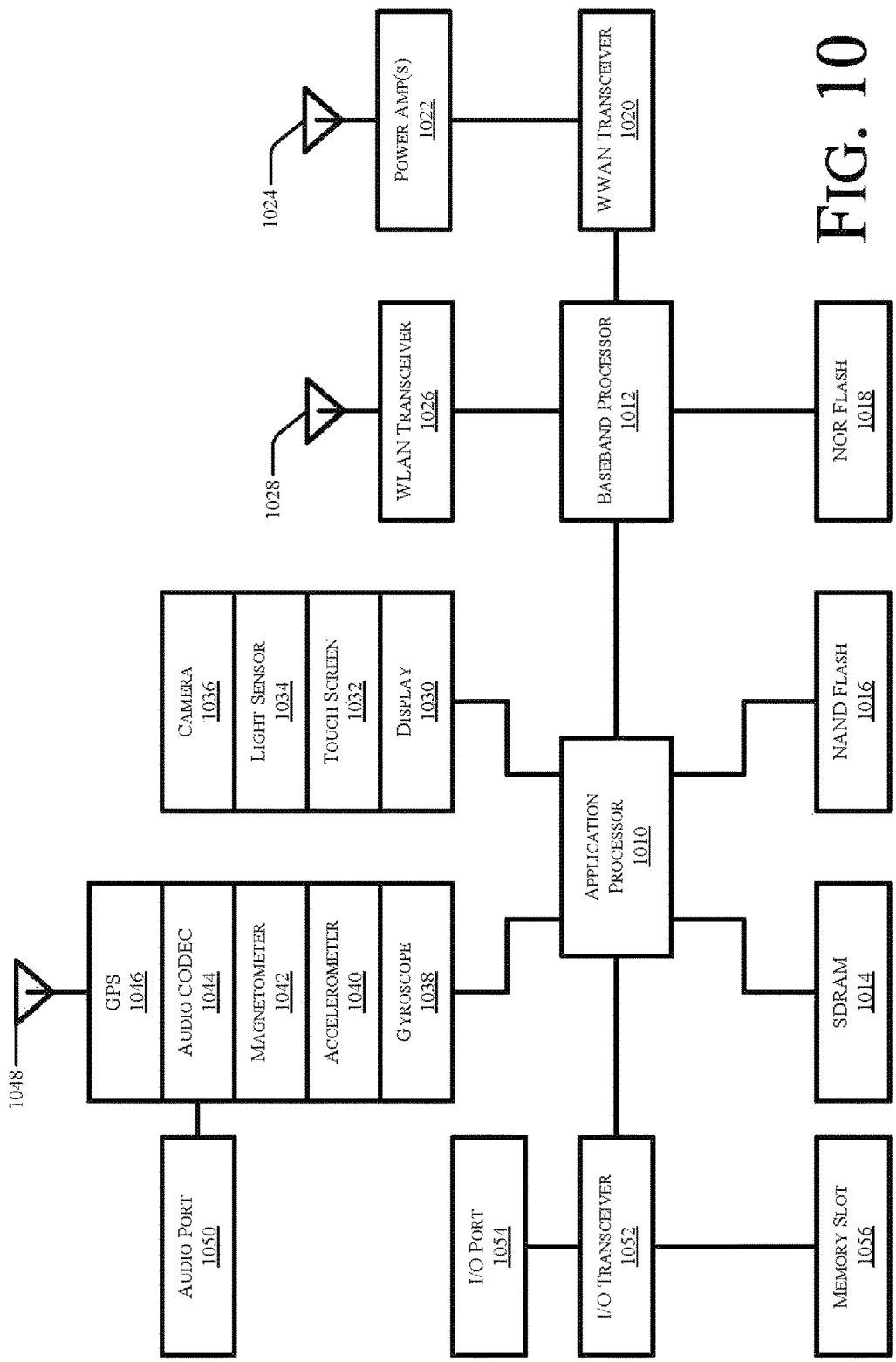
FIG. 10 is a schematic, block diagram illustration of an information-handling system in accordance with one or more exemplary embodiments disclosed herein.

FIG. 10 depicts an exemplary functional block diagram of an information-handling system 1000 that is capable of implementing methods to identify victims and aggressors according to the subject matter disclosed herein. Information handling system 1000 of FIG. 10 may tangibly embody one or more of any of the exemplary devices, exemplary network elements and/or functional entities of the network as shown in and described herein. In one example, information-handling system 1000 may represent the components of wireless device 200, subscriber station 616, CPE 622, base stations 614 and 620, eNB 710, and/or UE 711, with greater or fewer components depending on the hardware specifications of the particular device or network element. In another example, information-handling system may provide M2M-type device capability. In yet another exemplary embodiment, information-handling system 1000 is capable of providing an uplink-transmit-power control technique that reduces interference experienced at other wireless devices according to the subject matter disclosed herein. Although information-handling system 1000 represents one example of several types of computing platforms, information-handling system 1000 may include more or fewer elements and/or different arrangements of elements than shown in FIG. 8, and the scope of the claimed subject matter is not limited in these respects.

In one or more examples, information-handling system 1000 may comprise one or more applications processor 1010 and a baseband processor 1012. Applications processor 1010 may be utilized as a general purpose processor to run applications and the various subsystems for information handling system 1000, and to capable of providing an uplink-transmit-power control technique that reduces interference experienced at other wireless devices according to the subject matter disclosed herein. Applications processor 1010 may include a single core or alternatively may include multiple processing cores wherein one or more of the cores may comprise a digital signal processor or digital signal processing core. Furthermore, applications processor 1010 may include a graphics processor or coprocessor disposed on the same chip, or alternatively a graphics processor coupled to applications processor 1010 may comprise a separate, discrete graphics chip. Applications processor 1010 may include on-board memory, such as cache memory, and further may be coupled to external memory devices such as synchronous dynamic random access memory (SDRAM) 1014 for storing and/or executing applications, such as capable of providing an uplink-transmit-power control technique that reduces interference experienced at other wireless devices according to the subject matter disclosed herein. During operation, and NAND flash 1016 for storing applications and/or data even when information handling system 1000 is powered off.

In one example, a list of candidate nodes may be stored in SDRAM 1014 and/or NAND flash 1016. Further, applications processor 1010 may execute computer-readable instructions stored in SDRAM 1014 and/or NAND flash 1016 that result in an uplink-transmit-power control technique that reduces interference experienced at other wireless devices according to the subject matter disclosed herein.

In one example, baseband processor 1012 may control the broadband radio functions for information-handling system 1000. Baseband processor 1012 may store code for controlling such broadband radio functions in a NOR flash 1018. Baseband processor 1012 controls a wireless wide area network (WWAN) transceiver 1020 which is used for modulating and/or demodulating broadband network signals, for example, for communicating via a 3GPP LTE network or the like as discussed herein with respect to FIG. 10. The WWAN transceiver 1020 couples to one or more power amplifiers 1022 that are respectively coupled to one or more antennas 1024 for sending and receiving radio-frequency signals via the WWAN broadband network. The baseband processor 1012 also may control a wireless local area network (WLAN) transceiver 1026 coupled to one or more suitable antennas 1028 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1010 and baseband processor 1012, and the scope of the claimed subject matter is not limited in these respects. For example, any one or more of SDRAM 1014, NAND flash 1016 and/or NOR flash 1018 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1010 may drive a display 1030 for displaying various information or data, and may further receive touch input from a user via a touch screen 1032, for example, via a finger or a stylus. In one exemplary embodiment, screen 1032 display a menu and/or options to a user that are selectable via a finger and/or a stylus for entering information into information-handling system 1000.

An ambient light sensor 1034 may be utilized to detect an amount of ambient light in which information-handling system 1000 is operating, for example, to control a brightness or contrast value for display 1030 as a function of the intensity of ambient light detected by ambient light sensor 1034. One or more cameras 1036 may be utilized to capture images that are processed by applications processor 1010 and/or at least temporarily stored in NAND flash 1016. Furthermore, applications processor may be coupled to a gyroscope 1038, accelerometer 1040, magnetometer 1042, audio coder/decoder (CODEC) 1044, and/or global positioning system (GPS) controller 1046 coupled to an appropriate GPS antenna 1048, for detection of various environmental properties including location, movement, and/or orientation of information-handling system 1000. Alternatively, controller 1046 may comprise a Global Navigation Satellite System (GNSS) controller. Audio CODEC 1044 may be coupled to one or more audio ports 1050 to provide microphone input and speaker outputs either via internal devices and/or via external devices coupled to information-handling system via the audio ports 1050, for example, via a headphone and microphone jack. In addition, applications processor 1010 may couple to one or more input/output (I/O) transceivers 1052 to couple to one or more I/O ports 1054 such as a universal serial bus (USB) port, a high-definition multimedia interface (HDMI) port, a serial port, and so on. Furthermore, one or more of the I/O transceivers 1052 may couple to one or more memory slots 1056 for optional removable memory, such as secure digital (SD)

card or a subscriber identity module (SIM) card, although the scope of the claimed subject matter is not limited in these respects.

Figure 11:
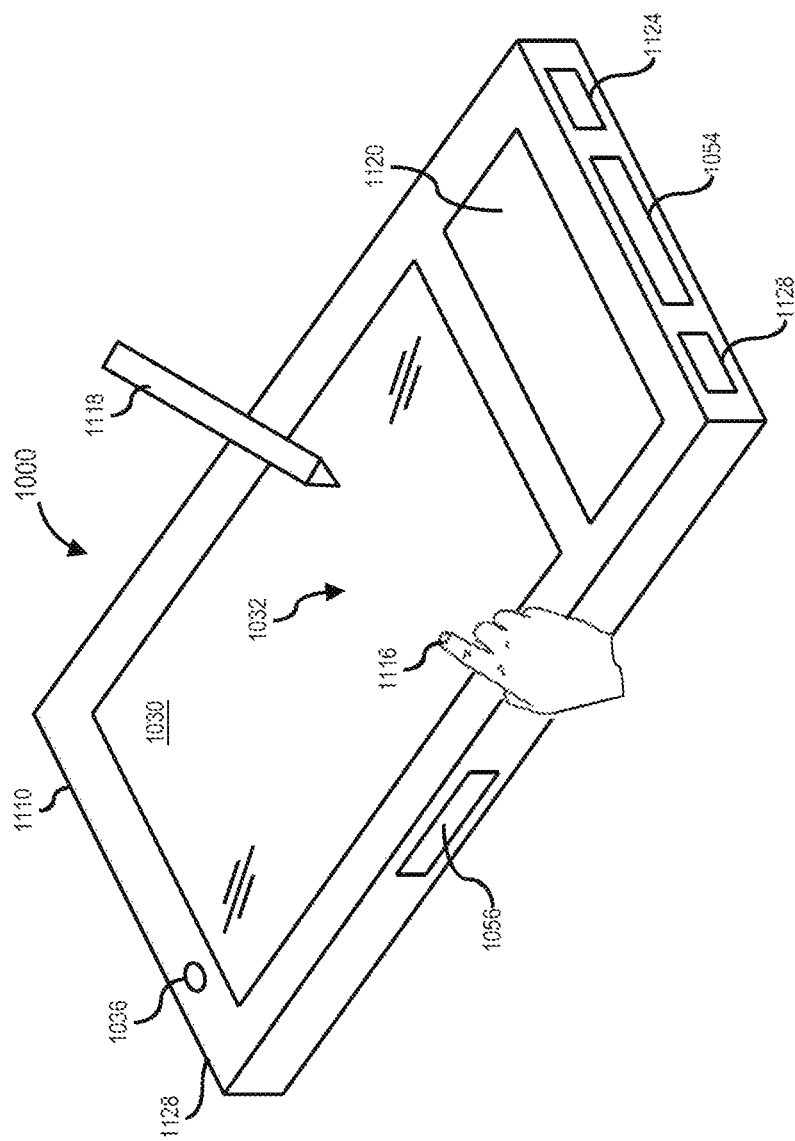
FIG. 11 is an isometric view of an exemplary embodiment of the information-handling system of FIG. 10 that optionally may include a touch screen in accordance with one or more embodiments disclosed herein.

FIG. 11 depicts an isometric view of an exemplary embodiment of the information-handling system of FIG. 10 that optionally may include a touch screen in accordance with one or more embodiments disclosed herein. FIG. 11 shows an example implementation of information-handling system 1000 of FIG. 10 tangibly embodied as a cellular telephone, smartphone, smart-type device, or tablet-type device or the like, that is capable of implementing methods to identify victims and aggressors according to the subject matter disclosed herein. In one or more embodiments, the information-handling system 1000 may comprise any one of the infrastructure nodes, wireless device 400, subscriber station 616, CPE 622, mobile station UE 711 of FIG. 7, and/or an M2M-type device, although the scope of the claimed subject matter is not limited in this respect. The information-handling system 1000 may comprise a housing 1110 having a display 1030 that may include a touch screen 1032 for receiving tactile input control and commands via a finger 1116 of a user and/or a via stylus 1118 to control one or more applications processors 1010. The housing 1110 may house one or more components of information-handling system 1000, for example, one or more applications processors 1010, one or more of SDRAM 1014, NAND flash 1016, NOR flash 1018, baseband processor 1012, and/or WWAN transceiver 1020. The information-handling system 1000 further may optionally include a physical actuator area 1120 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1124 and a connection port 1054 for connecting the information-handling system 1000 to another electronic device, dock, display, battery charger, and so on. Additionally, information-handling system 1000 may include a headphone or speaker jack 1128 and one or more cameras 1036 on one or more sides of the housing 1110. It should be noted that the information-handling system 1000 of FIGS. 10 and 11 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 12:
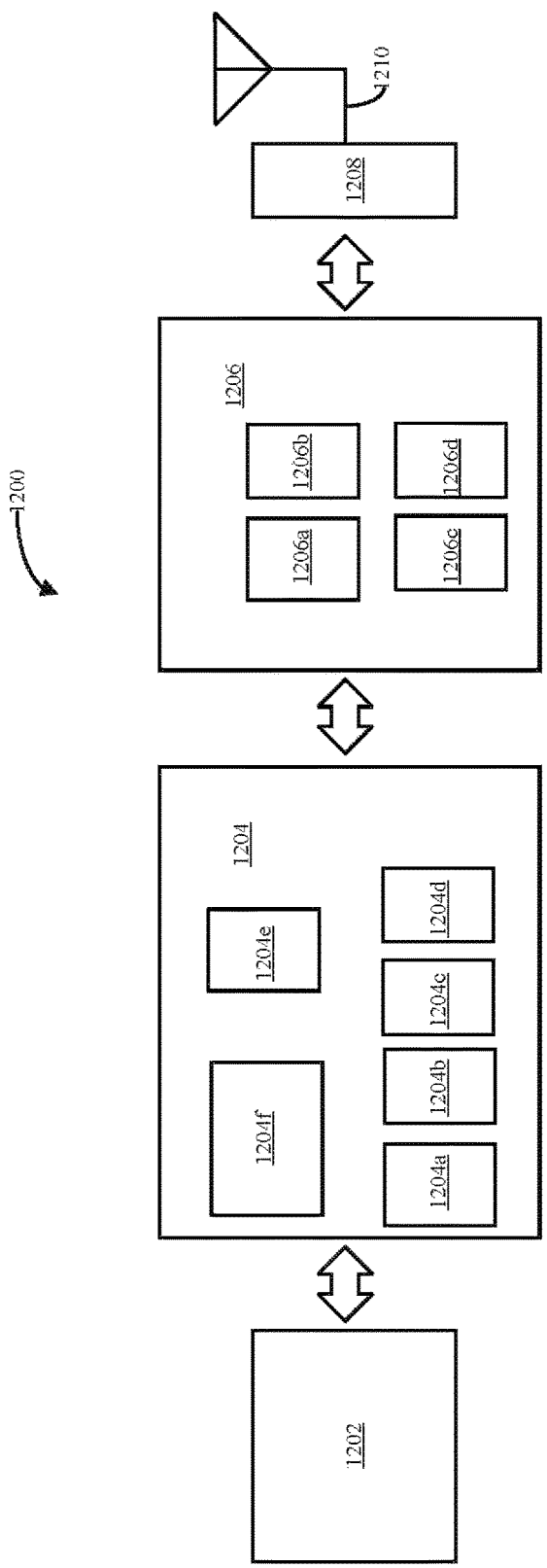
FIG. 12 is a schematic, block diagram illustration of components of a wireless device in accordance with one or more exemplary embodiments disclosed herein.

Embodiments described herein may be implemented into a system using any suitably configured hardware and/or software. FIG. 12 illustrates, for one embodiment, example components of a User Equipment (UE) device 1200. In some embodiments, the UE device 1200 may include application circuitry 1202, baseband circuitry 1204, Radio Frequency (RF) circuitry 1206, front-end module (FEM) circuitry 1208 and one or more antennas 1210, coupled together at least as shown.

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., fifth generation (5G), 6G, etc.). The baseband circuitry 1204 (e.g., one or more of baseband processors 1204a-d) may handle various radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204e of the baseband circuitry 1204 may be configured to run elements of the protocol stack for signaling of the PHY, MAC, RLC, PDCP and/or RRC layers. In some embodiments, the baseband circuitry may include one or more audio digital signal processor(s) (DSP) 1204f The audio DSP(s) 1204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206a, amplifier circuitry 1206b and filter circuitry 1206c. The transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c. The filter circuitry 1206c may include a low-pass filter (LPF), although the scope of the embodiments is not limited in this respect.

In some embodiments, the mixer circuitry 1206a of the receive signal path and the mixer circuitry 1206a of the transmit signal path may include two or more mixers and may be arranged for quadrature downconversion and/or upconversion respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and/or direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency)

and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210.

In some embodiments, the UE device 1200 may include additional elements such as, for example, memory/storage, display, camera, sensor, and/or input/output (I/O) interface.

In a first non-limiting example, an information handling system, comprises at least one processor and a memory coupled to the processor and comprising logic to detect a quality of service issue in a wireless communication downlink with a first user equipment in a first cell, and in response to detecting the quality of service issue, determine whether the user equipment is a victim of interference from a second user equipment or is a victim of interference from a downlink with a second user equipment in a second cell. The information handling system further comprises logic to instruct the first user equipment to measure a control channel reference signal power (RSRP) level for one or more control channel symbols in the downlink with the first user equipment in the first cell.

The information handling system further comprises logic to determine a parameter SINR_minPDCCH corresponding to a minimum signal to noise ratio (SINR) of a control channel in the downlink with the first user equipment in the first cell. The information handling system further comprises logic to determine a parameter SINR_minPDSCH corresponding to the minimum signal to noise ratio (SINR) of the physical downlink shared channel in the downlink with the first user equipment in the first cell. The information handling system further comprises logic to determine that the first user equipment is a victim interference from a second user equipment when the minimum signal to noise ratio (SINR) of the physical downlink shared channel (SINR_minPDSCH) is less than the minimum signal to noise ratio (SINR) of the control channel (SINR_minPDCCH) minus an offset factor. The information handling system further comprises logic to determine that the first user equipment is a victim interference from a downlink with a second user equipment in a second cell when the minimum signal to noise ratio (SINR) of the physical downlink shared channel (SINR_minPDSCH) is not less than the minimum signal to noise ratio (SINR) of the control channel (SINR_minPDCCH) minus an offset factor.

In another nonlimiting example, a controller comprises logic, at least partially including hardware logic, to detect a quality of service issue in a wireless communication downlink with a first user equipment in a first cell and in response to detecting the quality of service issue, determine whether the user equipment is a victim of interference from a second user equipment or is a victim of interference from a downlink with a second user equipment in a second cell. The controller further comprises logic, at least partially including hardware logic, to instruct the first user equipment to measure a control channel reference signal power (RSRP) level for one or more control channel symbols in the downlink with the first user equipment in the first cell. The controller further comprises logic, at least partially including hardware logic, to determine a parameter SINR_minPDCCH corresponding to a minimum signal to noise ratio (SINR) of a control channel in the downlink with the first user equipment in the first cell. The controller further comprises logic, at least partially including hardware logic, to determine a parameter SINR_minPDSCH corresponding to the minimum signal to noise ratio (SINR) of the physical downlink shared channel in the downlink with the first user equipment in the first cell. The controller further comprises logic, at least partially including hardware logic, to determine that the first user equipment is a victim interference from a second user equipment when the minimum signal to noise ratio (SINR) of the physical downlink shared channel (SINR_minPDSCH) is less than the minimum signal to noise ratio (SINR) of the control channel (SINR_minPDCCH) minus an offset factor. The controller further comprises logic, at least partially including hardware logic, to determine that the first user equipment is a victim interference from a downlink with a second user equipment in a second cell when the minimum signal to noise ratio (SINR) of the physical downlink shared channel (SINR_minPDSCH) is not less than the minimum signal to noise ratio (SINR) of the control channel (SINR_minPDCCH) minus an offset factor.

In another nonlimiting example, an information handling system, comprises at least one processor communicatively coupled to a first base station in a first cell of a cellular network, and a memory coupled to the processor and comprising logic to generate a total weighted interference value for all interference measurements acting on a victim and initiate a request to at least a second base station in a second cell of the cellular network for the base station to identify an aggressor when the total weighted interference value is greater than a threshold interference value. The information handling system further comprises logic to generate a request for a listing of sub-band channel quality indicators (CQIs) and a corresponding bitmap of respective uplink physical resource block (PRB) status from the second base station in the second cell of the cellular network. The information handling system further comprises logic to receive a listing of sub-band channel quality indicators (CQIs) and a corresponding bitmap of respective uplink physical resource block (PRB) status from the second base station in the second cell of the cellular network and use the listing to generate the weighted interference value for all interference measurements acting on the victim. The information handling system further comprises logic to map the sub-band channel quality indicators (CQIs) into a vector and set a weighting factor vector for the sub-band channel quality indictors in the vector. The information handling system further comprises logic to determine the total weighted interference value from the sub-band channel quality indicators and the weighting factor vector.

In another nonlimiting example, a controller comprises logic, at least partially including hardware logic, to generate a total weighted interference value for all interference measurements acting on a victim and initiate a request to at least a second base station in a second cell of the cellular network for the base station to identify an aggressor when the total weighted interference value is greater than a threshold interference value. The controller further comprises logic, at least partially including hardware logic, to generate a request for a listing of sub-band channel quality indicators (CQIs) and a corresponding bitmap of respective uplink physical resource block (PRB) status from the second base station in the second cell of the cellular network. The controller further comprises logic, at least partially including hardware logic, to receive a listing of sub-band channel quality indicators (CQIs) and a corresponding bitmap of respective uplink physical resource block (PRB) status from the second base station in the second cell of the cellular network and use the listing to generate the weighted interference value for all interference measurements acting on the victim. The controller further comprises logic, at least partially including hardware logic, to map the sub-band channel quality indicators (CQIs) into a vector and set a weighting factor vector for the sub-band channel quality indictors in the vector. The controller further comprises logic, at least partially including hardware logic, to determine the total weighted interference value from the sub-band channel quality indicators and the weighting factor vector.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. An information handling system, comprising:
at least one processor; and
a memory coupled to the processor and comprising logic to:
detect a quality of service issue in a wireless communication downlink with a first user equipment in a first cell;
in response to detecting the quality of service issue, determine whether the user equipment is a victim of interference from a second user equipment or is a victim of interference from a downlink with a second user equipment in a second cell;
determine a parameter SINR_minPDCCH corresponding to a minimum signal to noise ratio (SINR) of a control channel in the downlink with the first user equipment in the first cell;
determine a parameter SINR_minPDSCH corresponding to the minimum signal to noise ratio (SINR) of the physical downlink shared channel in the downlink with the first user equipment in the first cell; and
determine that the first user equipment is a victim interference from a second user equipment when the minimum signal to noise ratio (SINR) of the physical downlink shared channel (SINR_minPDSCH) is less than the minimum signal to noise ratio (SINR) of the control channel (SINR_minPDCCH) minus an offset factor.

2. The information handling system of claim 1, further comprising logic to:
instruct the first user equipment to measure a control channel reference signal power (RSRP) level for one or more control channel symbols in the downlink with the first user equipment in the first cell.

3. The information handling system of claim 1, further comprising logic to:
determine that the first user equipment is a victim interference from a downlink with a second user equipment in a second cell when the minimum signal to noise ratio (SINR) of the physical downlink shared channel (SINR_minPDSCH) is not less than the minimum signal to noise ratio (SINR) of the control channel (SINR_minPDCCH) minus an offset factor.

4. A controller comprising logic to:
detect a quality of service issue in a wireless communication downlink with a first user equipment in a first cell;
in response to detecting the quality of service issue, determine whether the user equipment is a victim of interference from a second user equipment or is a victim of interference from a downlink with a second user equipment in a second cell;
determine a parameter SINR_minPDCCH corresponding to a minimum signal to noise ratio (SINR) of a control channel in the downlink with the first user equipment in the first cell;
determine a parameter SINR_minPDSCH corresponding to the minimum signal to noise ratio (SINR) of the physical downlink shared channel in the downlink with the first user equipment in the first cell; and
determine that the first user equipment is a victim interference from a second user equipment when the minimum signal to noise ratio (SINR) of the physical downlink shared channel (SINR_minPDSCH) is less than the minimum signal to noise ratio (SINR) of the control channel (SINR_minPDCCH) minus an offset factor.

5. The controller of claim 4, further comprising logic to:
instruct the first user equipment to measure a control channel reference signal power (RSRP) level for one or more control channel symbols in the downlink with the first user equipment in the first cell.

6. The controller of claim 4, further comprising logic to: determine that the first user equipment is a victim interference from a downlink with a second user equipment in a second cell when the minimum signal to noise ratio (SINR) of the physical downlink shared channel (SINR_minPDSCH) is not less than the minimum signal to noise ratio (SINR) of the control channel (SINR_minPDCCH) minus an offset factor.

7. An information handling system, comprising:
at least one processor communicatively coupled to a first base station in a first cell of a cellular network; and
a memory coupled to the processor and comprising logic to:
generate a total weighted interference value for all interference measurements acting on a victim;
initiate a request to at least a second base station in a second cell of the cellular network for the base station to identify an aggressor when the total weighted interference value is greater than a threshold interference value; and
generate a request for a listing of sub-band channel quality indicators (CQIs) and a corresponding bitmap of respective uplink physical resource block (PRB) status from the second base station in the second cell of the cellular network.

8. The information handling system of claim 7, further comprising logic to:
receive a listing of sub-band channel quality indicators (CQIs) and a corresponding bitmap of respective uplink physical resource block (PRB) status from the second base station in the second cell of the cellular network; and
use the listing to generate the weighted interference value for all interference measurements acting on the victim.

9. The information handling system of claim 8, further comprising logic to:
map the sub-band channel quality indicators (CQIs) into a vector; and
set a weighting factor vector for the sub-band channel quality indictors in the vector.

10. The information handling system of claim 9, further comprising logic to:
determine the total weighted interference value from the sub-band channel quality indicators and the weighting factor vector.

11. A controller comprising logic to:
generate a total weighted interference value for all interference measurements acting on a victim;
initiate a request to at least a second base station in a second cell of the cellular network for the base station to identify an aggressor when the total weighted interference value is greater than a threshold interference value; and
generate a request for a listing of sub-band channel quality indicators (CQIs) and a corresponding bitmap of respective uplink physical resource block (PRB) status from the second base station in the second cell of the cellular network.

12. The controller of claim 11, further comprising logic to receive a listing of sub-band channel quality indicators (CQIs) and a corresponding bitmap of respective uplink physical resource block (PRB) status from the second base station in the second cell of the cellular network; and
use the listing to generate the weighted interference value for all interference measurements acting on the victim.

13. The controller of claim 12, further comprising logic to map the sub-band channel quality indicators (CQIs) into a vector; and
set a weighting factor vector for the sub-band channel quality indictors in the vector.

14. The controller of claim 13, further comprising logic to determine the total weighted interference value from the sub-band channel quality indicators and the weighting factor vector.

* * * * *